(No Model.) 2 Sheets—Sheet 1.
J. L. GIVEN.
PNEUMATIC CASH CARRIER APPARATUS.
No. 379,890. Patented Mar. 20, 1888.
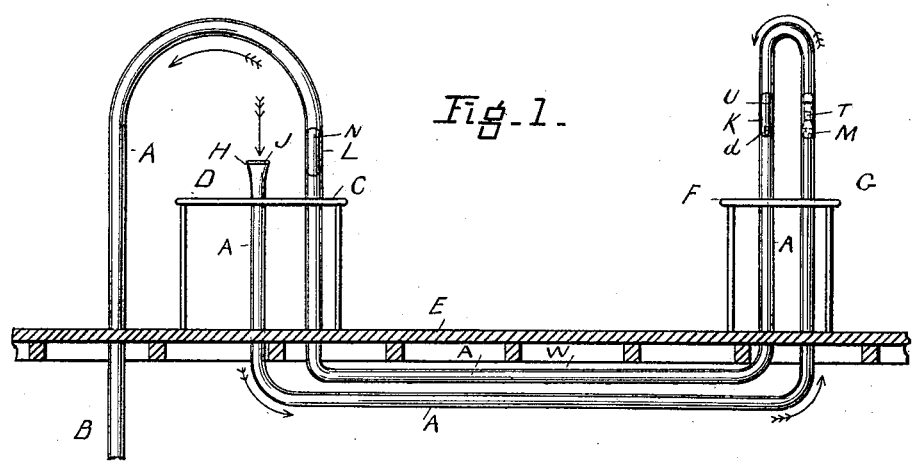
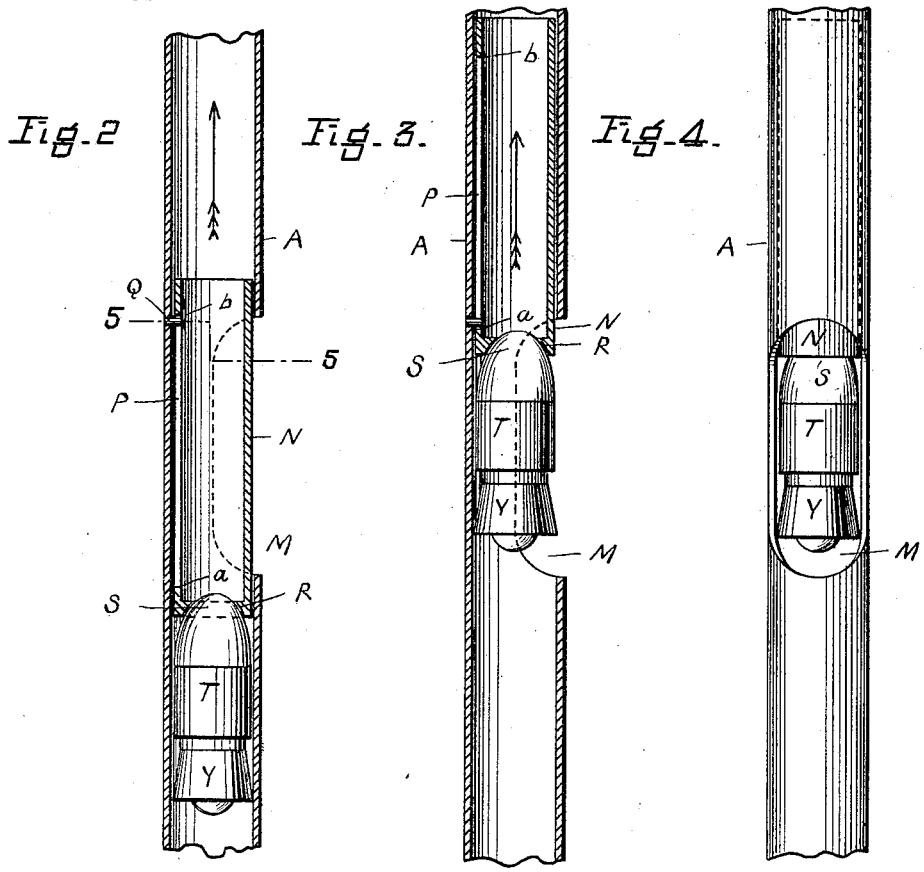
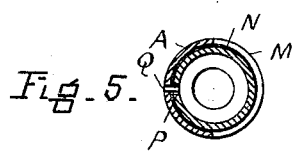
WITNESSES
Percy Bryant
C. E. Nichols
INVENTOR
John L. Given
per Edwin W. Brown
Attorney (No Model.) 2 Sheets—Sheet 2.
J. L. GIVEN.
PNEUMATIC CASH CARRIER APPARATUS.

No. 379,890. Patented Mar. 20, 1888.

WITNESSES.
Percy Bryant.
C. E. Nichol.

INVENTOR.
John L. Given.
per Edwin W. Brown.
Attorney.

UNITED STATES PATENT OFFICE.

JOHN L. GIVEN, OF MELROSE, ASSIGNOR TO HIMSELF, AND GEORGE B. KELLY, OF BOSTON, MASSACHUSETTS.

PNEUMATIC CASH-CARRIER APPARATUS.

SPECIFICATION forming part of Letters Patent No. 379,890, dated March 20, 1888.

Application filed November 22, 1887. Serial No. 255,900. (No model.)

*To all whom it may concern:*

Be it known that I, JOHN L. GIVEN, of Melrose, in the county of Middlesex and State of Massachusetts, have invented certain new and useful Improvements in Pneumatic Cash-Carrier Tubes, of which the following is a full, clear, and exact description.

This invention relates to improvements in pneumatic tubes that are used for the transmission of cash-carriers or other articles therethrough; and the invention consists of a pneumatic tube suitably arranged and adapted for the transmission of a carrier or other article therethrough by means of an air-exhaust apparatus in suitable connection therewith, said tube having an opening at a desired point or place in the side of the tube for the delivery thereat of a carrier, &c., the tube being provided at such opening with a valve or gate or door arranged to move back and forth within said tube to open and close said opening, said valve or gate being preferably in the form of a tube and closely fitting within the pneumatic tube, open from end to end for the air, in the operation of the air-exhaust apparatus, to freely pass through it, and one of its ends having an internal seat adapted to receive the end of the carrier, &c., to close upon said seat and close said valve to the passage of air therethrough by making an air-tight or substantially air-tight connection therewith, by which in the operation of the air-exhaust apparatus connected to said tube said valve, with the carrier, will be moved as one along said tube within certain limits, the valve away from and the carrier to and opposite the opening, which is then free and clear for the carrier to be removed from the tube or delivered therefrom at said opening, said valve then moving back by gravity or by any suitable means to its normal position over and to close said opening, and be in position for the reception of another carrier and movement thereof, as before, to open said opening for the delivery of the carrier and to then close again, and so on, all substantially as hereinafter fully described, reference being had to the accompanying plate of drawings, in which is illustrated, in—

Figure 6:
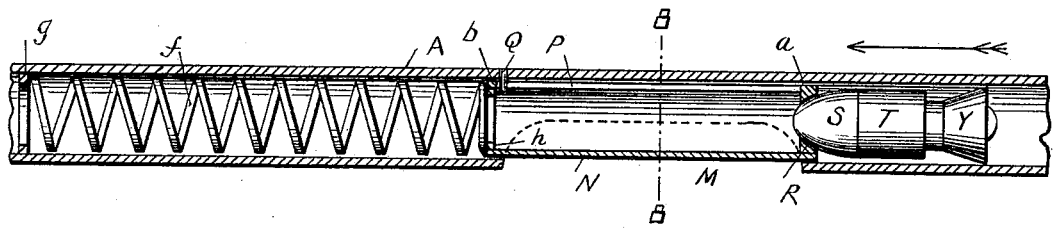
Figure 7:
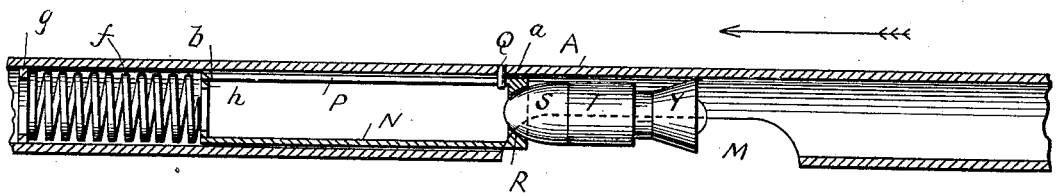
Figure 8:
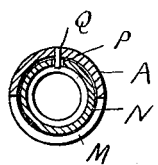

Figure 1, a pneumatic tube between and connecting two stations for the transmission therethrough from one station to the other, and vice versa, of a carrier or other article for operation by means of an air-exhausting apparatus. Figs. 2 and 3 are detail longitudinal central vertical sections from front to rear of the tube at one of the delivery-openings, Fig. 2 showing the valve as closed with a carrier in connection therewith, and Fig. 3 as opened with the carrier opposite to the delivery-opening and in position to be removed from the pneumatic tube. Fig. 4 shows a front view of Fig. 3. Fig. 5 is a cross-section on line 5 5, Fig. 2. Figs. 6 and 7 are longitudinal central sections like Figs. 2 and 3, the tube being in a horizontal plane, and showing a modification to be hereinafter referred to. Fig. 8 is a cross-section on line 8 8, Fig. 6.

In the drawings, A represents a pneumatic tube for the transmission of a carrier or other article therethrough and to be connected at its end B to any suitable air-exhausting apparatus, not necessary to be herein shown or described. The tube extends therefrom to the table C at the station D, thence down through the same and below the floor E to and up through a table, F, at the other station, G, and then returns down through the table F and floor to the table C at station D, where it terminates in a vertical position, having its end H open and preferably flaring, all substantially as shown in Fig. 1 in side elevation.

The tube A has two receiving-openings, one, J, being the open end H at station D, and the other, K, at the station G, and two delivery-openings, L M, in the front side of the tube A, respectively, at stations D and G.

Each of the outlets or delivery-openings L M has a valve, N, and the description of the construction and arrangement of one will answer for both, one being a duplicate of the other, and such opening and the construction and arrangement of its valve are shown in Figs. 2 to 5, which are enlarged.

The openings L M are made in the front side of the tube in any suitable manner, and each is of a length and width for the carrier to be easily removed from the tube at such opening.

The valve or gate N is made in the present instance of a short tube, its external diameter fitting closely the internal diameter of the tube A, but so that it can freely slide back and forth or up and down in said pneumatic tube and yet maintain a close fit within the pneumatic tube to substantially prevent air from passing between the two, and it is of a length, when opposite its opening in the pneumatic tube, to extend each way a short distance above and below the opening to practically close the opening to the escape of air therefrom or entrance thereto, as shown in Fig. 2. The valve has a longitudinal slot, P, in its back side, which is arranged to slide over a radially-projecting pin, Q, secured to the inside of the tube, by which the valve in its upward movement abuts by the end $a$ of its slot against said pin, and when down rests by its end $b$ upon said pin, which controls and limits the up and down or opening and closing movements of the valve.

The valve N is open from end to end, so that in the operation of the air-exhausting apparatus the air can freely pass therethrough, in order to not interfere with its operation in exhausting air from the whole length of the tube for the transmission of the carrier, &c., therethrough. Its lower end is shaped to form an internal seat, R, which is of a construction to receive the end S of the carrier T—in the present instance circular in cross-section, as shown in Figs. 2 and 3.

The operation is as follows: The air-exhausting apparatus, in operation, by its connection at the end B of the pneumatic tube, acts to draw or suck air through the tube A, from the end H in the direction of the arrows shown in Figs. 1, 2, and 3. The carrier T is then, for instance, placed in the opening J at the flaring end H of the pneumatic tube at the station D, its pointed end downward, when, from the action of the air-exhausting apparatus, it will pass along the pneumatic tube until it arrives at the outlet or opening M at the other station, G, where it makes by its end S a close union with the seat R of the valve N, which then moves with the valve, because of the closing of the open end of the valve by the carrier to the passage of air therethrough along the pneumatic tube until the valve is stopped by the abutment of the end $a$ of its slot P against the pin Q, the valve then being away from the opening M, as shown in Fig. 3, and the carrier opposite thereto, the valve leaving the opening free and clear for the carrier to be removed from the tube at such opening by hand, or in any suitable manner. As soon as the carrier is removed from the tube at the opening M, it leaves the end R of the valve open and free for air to pass through the valve, which will then fall by its gravity to its position in front of the opening M, resting by the end $b$ of its slot P on the pin Q, as shown in Fig. 2, and close the same to air entering or leaving to interfere with the proper operation of the exhaust apparatus on the pneumatic tube.

It is desirable and preferable that the momentum of the carrier should cease, or substantially cease, at the time it makes a union with the valve at its seat R, so that it will not strike the valve too forcibly, and thus injure the valve, and so that the exhaustion of air only shall practically affect or operate on the valve and carrier to move the valve away from and the carrier to and opposite the outlet or delivery opening for the delivery of the carrier therefrom. For such purpose the pneumatic tube can have a quick bend near the delivery-opening, by which the momentum of the carrier as it travels along such portion of the tube will be decreased, and thus the desired and proper contact made with the valve; but any other suitable construction and arrangement of parts may be used for such purpose.

The valve can be of any suitable form and construction in lieu of a tube form, as shown, it only being necessary for it to properly close the delivery-opening M and to have a suitable seat, R, for the carrier to close upon to prevent air passing through it and to stop its movements at desired points; but the tube form is practical and simple and cheap in its construction and adjustment and practical in operation.

When desirous of returning the carrier from the station G to the station D, the carrier is inserted at an opening, K, in the pneumatic tube at the station G, which opening is controlled by a valve, U, of tubular form, within the pneumatic tube, like the valve N, open from end to end to allow air to pass through it, but dispensing with the seat R, the valve having a handle, $d$, or any desirable means for opening it when placing the carrier therein, its closing movement being by gravity, if the tube is vertical, or by any suitable means, or by hand. Opening the valve U at the opening K and inserting the carrier through the opening into the pneumatic tube, its point S downward, and closing the valve, the carrier will then, from the operation of the air-exhaust apparatus, be drawn along the portion W of the pneumatic tube until it arrives at the delivery opening or outlet L, where it makes contact and union with the valve N at such opening, as shown in Fig. 2, and then with the valve it is moved along until the valve is stopped and uncovers the opening L, as shown in Fig. 3, when the carrier can be removed by hand, as before, the valve closing by its gravity.

The carrier T is of any suitable construction and material suitable to hold money or other small articles, and having a lid or cover at one end hinged thereto for opening and closing the same, and provided with an apron, Y, made of any suitable flexible material, which, in the operation of the apparatus, makes, from the pressure of air behind it as the air is exhausted in front of it a close joint with the tube, whereby the carrier is the more effectually made to travel through the tube.

The pneumatic tube at the opening for the delivery of the carrier can be horizontal in lieu of vertical, as shown, or at any angle between the two positions, and when at such an angle that the valve cannot close by its gravity it can be operated by a spring to return it to its normal or closed position, as shown in Figs. 6, 7, and 8. In these views the parts are all the same as in the other views except that the pneumatic tube is arranged in a horizontal position, having its delivery-opening M on its under side, and the valve N has a spiral spring, $f$, to return it to its normal position, the spring being secured within the tube by one end to a flange or rim, $g$, of the tube, its free end bearing against the end $h$ of the valve. In operation, when the carrier T makes connection with the valve, as shown in Fig. 6, the two are forced along the tube by the exhaustion of the air therefrom, as before, until the valve is away from and the carrier is over the delivery-opening M, as shown in Fig. 7, when the carrier can be removed from the tube, and then, with the seat end R of the valve open for air to pass through the valve, the spring will react to return it to its normal position, as shown in Fig. 6, the spring being of less power, and so intended to be when the carrier is joined to the valve, than the pressure of air thereon, caused by the exhaustion or suction in front of it; but it is of sufficient power after such pressure is relieved to return the valve to its normal position. In lieu of the tube being in a vertical or horizontal plane it can be at any angle between the two, and correspondingly to its angle of inclination, gravity or the spring or any suitable means can be used to return the valve to its normal position and close the opening.

Any suitable spring can be used in lieu of the spiral; but the spiral spring is preferable, as it does not interfere or interrupt the passage of air through the tube in the operation of the air-exhaust apparatus. The spring can also be arranged in any suitable manner to return the valve to its closed position—as, for instance, the pin Q can be secured to the valve and project through a longitudinal slot in the tube, one on each side, and springs attached to the same outside of the tube, but as shown is preferable.

Among the many advantages of the present invention may be mentioned the following: While a carrier is in connection with the valve, thus closing the valve to air passing through, and consequently interrupting the passage of air through the tube back of the carrier and valve, a second carrier, if placed in the tube at the receiving or sending opening, will not be acted upon or moved along the tube, remaining stationary so long as the first carrier is joined to the valve, by which the crowding or jamming of carriers together in the tube is prevented, and thus injury to the tube or carriers obviated.

Having thus described my invention, what I claim is—

1. The combination, with a pneumatic tube for the transmission of a carrier, &c., therethrough, provided with an opening or outlet for the delivery thereat of the carrier, &c., of a valve adapted to move back and forth in said tube to open and close said opening, of a construction to allow air to pass freely through it, and adapted to receive a carrier, &c., to close said valve to the passage of air through it, for the purpose specified.

2. The combination, with a pneumatic tube for the transmission of a carrier, &c., therethrough, provided with an opening or outlet for the delivery of a carrier thereat, of a valve adapted to move back and forth in said tube to open and close said opening, of a construction to allow air to pass freely through it, and provided with a seat at one end for the reception of a carrier, &c., to close the valve to the passage of air therethrough, for the purpose specified.

3. The combination, with a pneumatic tube for the transmission of a carrier, &c., therethrough, provided with an opening or outlet for the delivery of a carrier thereat, of a valve made of tube form adapted to move back and forth in said tube to open and close said opening, open from end to end for air to pass freely through it, and provided with a seat at one end for the reception of a carrier, &c., to close the valve to the passage of air therethrough, for the purpose specified.

4. The combination, with a pneumatic tube for the transmission of a carrier, &c., therethrough, provided with an opening or outlet for the delivery of a carrier thereat, of a valve made of tube form, open from end to end for air to pass freely through it, arranged to move back and forth in said tube to open and close said opening, having a longitudinal slot, P, to engage with a pin, Q, and provided with a seat at one end adapted to receive the end of the carrier and close the valve to the passage of air therethrough, for the purpose specified.

In testimony whereof I have hereunto set my hand in the presence of two subscribing witnesses.

JOHN L. GIVEN.

Witnesses:
EDWIN W. BROWN,
PERCY BRYANT.